(12) United States Patent
Fausak et al.

(10) Patent No.: US 10,938,857 B2
(45) Date of Patent: Mar. 2, 2021

(54) MANAGEMENT OF A DISTRIBUTED UNIVERSALLY SECURE EXECUTION ENVIRONMENT

(71) Applicant: DELL PRODUCTS, L.P., Round Rock, TX (US)

(72) Inventors: Andrew T. Fausak, Coppell, TX (US); Daniel L. Hamlin, Round Rock, TX (US); Charles D. Robison, Buford, GA (US)

(73) Assignee: Dell Products, L.P., Round Rock, TX (US)

( * ) Notice: Subject to any disclaimer, the term of this patent is extended or adjusted under 35 U.S.C. 154(b) by 289 days.

(21) Appl. No.: 16/110,107

(22) Filed: Aug. 23, 2018

(65) Prior Publication Data
US 2020/0067984 A1 Feb. 27, 2020

(51) Int. Cl.
*H04L 29/06* (2006.01)
(52) U.S. Cl.
CPC .......... *H04L 63/20* (2013.01); *H04L 63/0281* (2013.01); *H04L 63/08* (2013.01); *H04L 63/102* (2013.01)
(58) Field of Classification Search
CPC ..... H04L 63/20; H04L 63/0281; H04L 63/08; H04L 63/102
See application file for complete search history.

(56) References Cited

U.S. PATENT DOCUMENTS

| 10,063,375 B2 * | 8/2018 | Thom | G06F 21/85 |
| 2009/0103518 A1 * | 4/2009 | Yu | H04L 12/66 370/352 |

(Continued)

FOREIGN PATENT DOCUMENTS

WO WO-2015113046 A1 * 7/2015 ............ H04L 63/08

OTHER PUBLICATIONS (Wikipedia, Proxy server, Jan. 11, 2004, https://en.wikipedia.org/wiki/Proxy_server, retrieved Jul. 26, 2020, hereinafter Wikipedia).*

(Continued)

*Primary Examiner* — Farid Homayounmehr
*Assistant Examiner* — Suman Debnath
(74) *Attorney, Agent, or Firm* — Isidore PLLC (57) ABSTRACT

A method and an information handling system for security management across a plurality of diverse execution environments. The method includes associating, based on a distributed computing framework, a secure execution environment interface with each diverse execution environment. The method includes receiving a general access policy to access at least one secure memory region associated with a respective one of the diverse execution environments. In response to a request to access a memory region associated with at least one diverse execution environment, the method includes prompting for entry of security credentials. In response to receiving and verifying the security credentials, the method establishes access to the secure memory region of the respective diverse execution environment. The method includes executing a subroutine to modify at least a subset of the secure memory region, and the method includes returning a result to a distributed application via the secure execution environment interface.

20 Claims, 8 Drawing Sheets

(56) References Cited

U.S. PATENT DOCUMENTS

| | | | | |
|---|---|---|---|---|
| 2013/0254255 | A1* | 9/2013 | Nilsson | G06F 9/4881 |
| | | | | 709/201 |
| 2016/0019536 | A1* | 1/2016 | Ortiz | G06Q 20/3227 |
| | | | | 705/67 |
| 2016/0028728 | A1* | 1/2016 | Hampel | G06F 21/71 |
| | | | | 713/156 |
| 2017/0289197 | A1* | 10/2017 | Mandyam | H04L 63/06 |
| 2020/0067922 | A1* | 2/2020 | Avetisov | H04L 9/3234 |
| 2020/0213117 | A1* | 7/2020 | Resch | H04L 9/3247 |

OTHER PUBLICATIONS

Wenhao Li, et al., TEEv: virtualizing trusted execution environments on mobile platforms, VEE 2019: Proceedings of the 15th ACM SIGPLAN/SIGOPS International Conference on Virtual Execution EnvironmentsApr. 2019, pp. 2-16.*

Coombs, Rob, Securing the Future of Authentication with ARM TrustZone-based Trusted Execution Environment and Fast Identity Online (FIDO), pp. 1-7, ARM Limited (May 25, 2015).

* cited by examiner

MANAGEMENT OF A DISTRIBUTED UNIVERSALLY SECURE EXECUTION ENVIRONMENT

BACKGROUND

1. Technical Field

The present disclosure relates in general to service processors of an information handling system (IHS), and more particularly to a method and system for provisioning security credentials to access a secure service processor.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The operating system and/or applications provided within IHSs, and particular those IHSs connected to the internet or other public network, occasionally are the object of attacks by malware, ransomware, etc., which negatively affects the system's ability to operate as intended. Often, malware can access sensitive and confidential information on the IHS. Malware poses a serious threat to keeping systems and private data secure. With specialized malware, non-secure private information is transferred from a host computer to unauthorized individuals who can utilize the information to harm and/or steal from unsuspecting individuals whose secure information was stolen. On host computer systems, viruses, Trojans, device-drivers, and various "plugins" can provide personal private information to individuals who do not own and/or should not have access to the information.

To guard against these attacks on secure information, some IHS utilize secure execution environments (SEEs). SEEs are specialized run-time memory regions that assures that data and programs within these regions remain un-accessed by non-authorized means. Although conceptually the same, SEE implementations may vary significantly. Each implementation's primary goal is to assure that data and programs within SEE regions are not compromised (read, altered, or intercepted). There are two primary classes of SEE, Execute On Host (EOH) and Execute on Chip (EOC). Every SEE solution is unique and has specific advantages when compared to others offering similar features. However, neither the classes nor implementations of EOH and EOC are interchangeable. Further, the classes and implementations of EOH and EOC do not offer a secure solution across diverse IHS platforms.

BRIEF SUMMARY

Disclosed are a method and an information handling system for security management across a plurality of diverse execution environments. The method includes associating, based on a distributed computing framework, a secure execution environment interface with each diverse execution environment from among the plurality of diverse execution environments. The method also includes receiving, for each diverse execution environment, a general access policy to access at least one secure memory region associated with a respective one of the plurality of diverse execution environments. In response to a request from a distributed application to access a memory region associated with at least one diverse execution environment, the method includes prompting for entry of security credentials at the secure execution environment interface. In response to receiving and verifying the security credentials to obtain access to the secure memory region, the method further establishes, by the secure execution environment interface, access to the secure memory region of the respective one of the plurality of diverse execution environments. The method includes executing a subroutine provided by the distributed application to modify at least a subset of the secure memory region. The method further includes returning a result to the distributed application via the secure execution environment interface.

In another embodiment, a processor of an IHS associates, based on a distributed computing framework, a secure execution environment interface with each diverse execution environment from among the plurality of diverse execution environments. The processor receives, for each diverse execution environment, a general access policy to access at least one secure memory region associated with a respective one of the plurality of diverse execution environments. In response to a request from a distributed application to access a memory region associated with at least one diverse execution environment, the processor prompts for entry of security credentials at the secure execution environment interface. In response to receiving and verifying the security credentials to obtain access to the secure memory region, the processor establishes access, via the secure execution environment interface, to the secure memory region of the respective one of the plurality of diverse execution environments. The processor executes a subroutine provided by the distributed application to modify at least a subset of the secure memory region, and the processor returns a result to the distributed application via the secure execution environment interface.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Disclosed are a method and an information handling system for security management across a plurality of diverse execution environments. In accordance with embodiments of the present disclosure, an IHS includes a network interface device and a processor that is communicatively coupled to the network interface device. A memory system communicatively couples to the processor and has stored thereon a secure execution environment module. The secure execution environment module executes on the processor to enable the processor to associate, based on a distributed computing framework, a secure execution environment interface with each diverse execution environment from among the plurality of diverse execution environments. The processor receives, for each diverse execution environment, a general access policy to access at least one secure memory region associated with a respective one of the plurality of diverse execution environments. In response to a request from a distributed application to access a memory region associated with at least one diverse execution environment, the processor prompts for entry of security credentials at the secure execution environment interface. In response to receiving and verifying the security credentials to obtain access to the secure memory region, the processor establishes access to the secure memory region of the respective one of the plurality of diverse execution environments. The processor establishes access to the secure memory region by the secure execution environment interface. The processor executes a subroutine provided by the distributed application to modify at least a subset of the secure memory region, and the processor returns a result to the distributed application via the secure execution environment interface.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
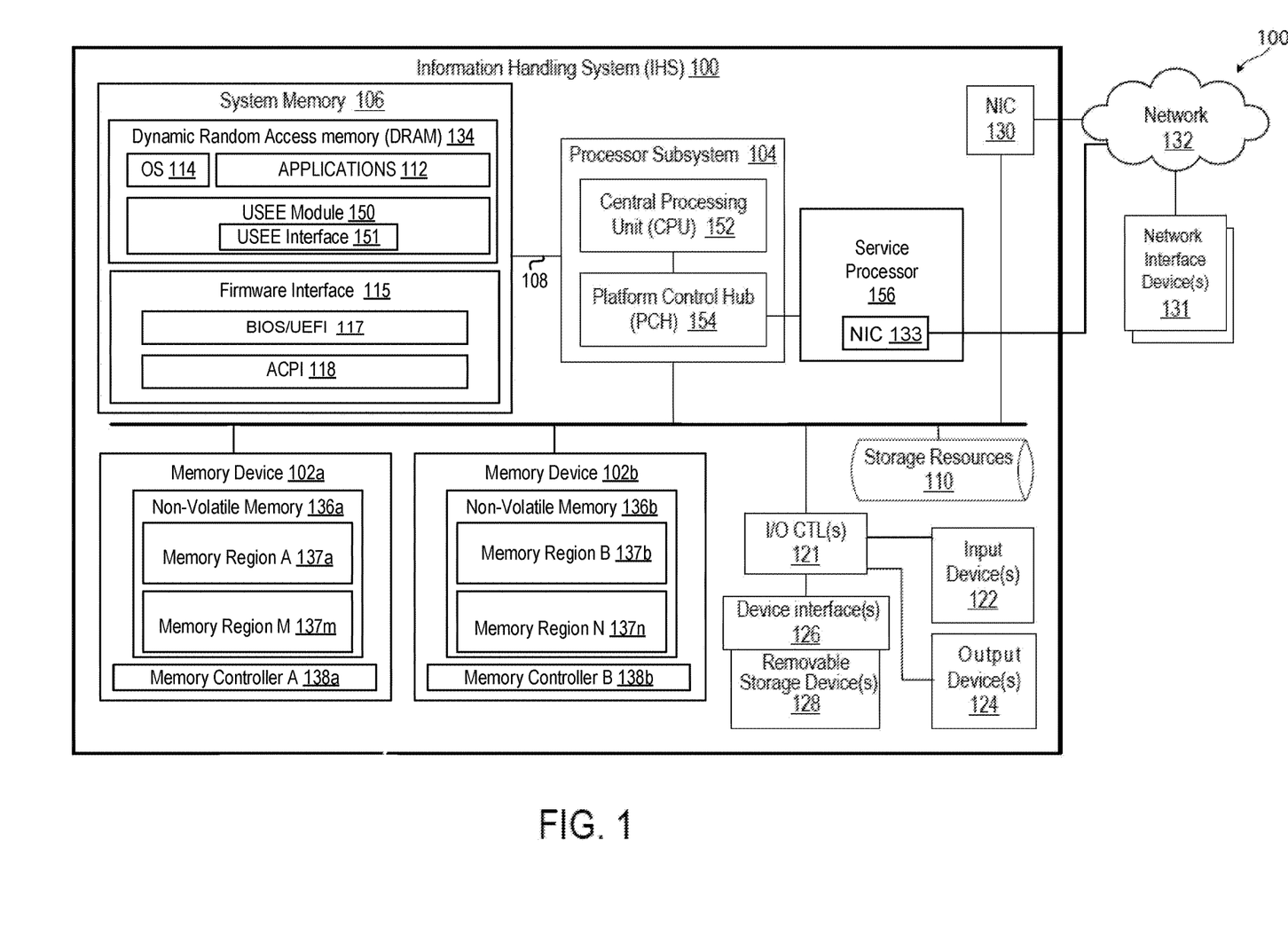
FIG. 1 illustrates a block diagram representation of an example information handling system (IHS) that supports management of a secure execution environment, according to one or more embodiments.

FIG. 1 illustrates a block diagram representation of an example information handling system (IHS) 100 that supports management of a secure execution environment. Within the general context of IHSs, IHS 100 may include any instrumentality or an aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a personal digital assistant, a consumer electronic device, a network storage device, or any other suitable device and may vary in size, shape, performance, functionality, and price. The IHS may include random access memory (RAM), one or more processing resources such as a central processing unit (CPU) or hardware or software control logic, read-only memory (ROM), and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Referring again to FIG. 1, processor subsystem 104 is coupled to system memory 106 via system interconnect 108. System interconnect 108 can be interchangeably referred to as a system bus, in one or more embodiments. System interconnect 108 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. System interconnect 108 communicatively couples various system components including, for example, system interconnect 108 communicatively couples replaceable local storage resources 110 such as solid-state drives (SSDs) and hard disk drives (HDDs). One or more software and/or firmware modules can be stored within SDDs and HDDs, and one or more sets of data can be utilized during management operations of/for IHS 100. Specifically, in one embodiment, system memory 106 can include therein a plurality of such modules stored in dynamic random-access memory (DRAM) 134. These modules include one or more of application(s) 112 and operating system (OS) 114. Application(s) 112 may include a word processing application, a presentation application, and a management station application, among other applications. The various applications having varying functionality when their corresponding program code is executed by processor subsystem 104 or other processing devices within IHS 100. Further, firmware interface 115 can be coupled to and/or stored within system memory 106. Firmware interface 116 may include, for example, Basic Input/Output System (BIOS) or Unified Extensible Firmware Interface (UEFI) (117). BIOS is non-volatile firmware used to perform hardware initialization during the booting process (power-on startup), and to provide runtime services for operating systems and programs. UEFI is a specification for a software program that connects a computer's firmware to its operating system (OS). BIOS or UEFI has instructions for controlling input/output operations associated with IHS 100. Collectively, BIOS/UEFI are represented herein as BIOS/UEFI drivers 117. In one embodiment BIOS/UEFI drivers 117 are utilized to provide runtime services to IHS 100. Additionally, firmware interface 115 includes Advanced Configuration and Power Interface (ACPI) firmware 118.

IHS 100 also includes one or more memory devices 102a and 102b coupled to a processing subsystem, or "processor" 104. Regions of memory devices 102a and 102b can be configured as persistent memory. Memory devices 102a and 102b may have a shared memory controller or separate memory controller. The memory controllers connected to memory devices 102a and 102b is represented here as memory controller 138a and 138b. Each of memory device 102a and 102b can include non-volatile memory. For example, memory device 102a includes non-volatile memory 136a, and memory device 102b includes non-volatile memory 136b. Further, non-volatile memory 136a and 136a include, respectively, memory regions 137a-m and 137b-n.

IHS 100 further includes one or more input/output (I/O) controllers 121 that support connection by and processing of signals from one or more connected input device/s 122, such as a keyboard, mouse, touch screen, or microphone. I/O controllers 121 also support connection to and forwarding of output signals to one or more connected output devices 124, such as a monitor or display device or audio speaker(s). Additionally, in one or more embodiments, one or more device interfaces 126, such as an optical reader, a Universal Serial Bus (USB), a card reader, Personal Computer Memory Card International Association (PCMCIA) slot, and/or a high-definition multimedia interface (HDMI), can be associated with IHS 100. Device interface(s) 126 can be utilized to enable data to be read from or be stored to corresponding removable storage device/s, such as a compact disk (CD), digital video disk (DVD), flash drive, or flash memory card. In one or more embodiments, device interface(s) 126 can further include general purpose I/O interfaces such as inter-integrated circuit ($I^2C$), system management bus (SMB), and peripheral component interconnect (PCI) buses.

IHS 100 includes network interface controller (NIC) 130. NIC 130 enables IHS 100 and/or components within IHS 100 to communicate and/or interface with other devices, services, and components, generally represented as network devices 131, which are located external to IHS 100. These devices, services, and components can interface with IHS 100 via an external network, such as example network 132, using one or more communication protocols that include transport control protocol (TCP/IP) and network block device (NBD) protocol. Network 132 can be a local area network, wide area network, personal area network, and the like, and the connection to and/or between network, and IHS 100 can be wired, wireless, or a combination thereof. For purposes of discussion, network 132 is indicated as a single collective component for simplicity. However, it should be appreciated that network 132 can comprise one or more direct connections to other devices as well as a more complex set of interconnections as can exist within a local area network or a wide area network, such as the Internet. Network devices 131 can include, but are not limited to including, devices that support secure execution environments (SEE), such as Execute on Host (EOH), Execute on Chip/Co-processor (EOC), and Secure Execution as a Service (SEEaaS).

Processor subsystem 104 can include a central processing unit (CPU) 152 that is augmented by a platform control hub (PCH) 154. The PCH 154 interfaces to functional components of the IHS 100, such as service processor 156. Service processor 156 operates as a system management interface that is capable of managing request from distributed applications received by IHS 100. Service processor 156 is embedded within the main circuit board or motherboard of IHS 100. Service processor 156 can help to monitor additional servers and/or devices within a distributed computing system communicating remotely with IHS 100. Service processor 156 may manage and/or monitor one or more virtual machine(s) within a virtualized computing environment associated with IHS 100. Further, service processor may manage and/or monitor memory access requests from network devices 131 that are associated with a secure execution environment in a remote a virtualized computing environment. Service processor 156 may include a network interface card that is separate from NIC 130. For example, service processor (SP) NIC 133 is utilized to isolate processes associated with requests from distributed applications from other system components and computational hardware of IHS 100.

System memory 106 includes universally secure execution environment (USEE) module 150. USEE module 160 includes USEE interface 151. In one embodiment, USEE module 150 is a separate software utility that is stored within system memory 106. Processor 104 selectively executes USEE module 150 in response to receiving a request for access to a memory region (137*a-n*) from applications associated with devices from among network devices 131 within a secure execution environment. In one embodiment, service processor 156 detects the request from the second device via NIC 133. Service processor 156 detects the request from an application, such as a calling application, that is associated with a device(s)s within the secure execution environment.

One functionality provided by USEE module 160 is that of normalizing access to memory regions associated with various secure execution computing environments external to IHS 100. In one embodiment, during boot-up or booting operations of IHS 100, processor 104 loads USEE module 150 to system memory 106. USEE module 150 manages memory requests to SEE devices from a distributed application, and more specifically memory requests to various configurations of SEE devices from a distributed application. Additional aspects of USEE module 160 and functionalities associated thereof are presented within the description of FIGS. 2-8, with each figure described with reference to components presented within the preceding figure(s).

Figure 2:
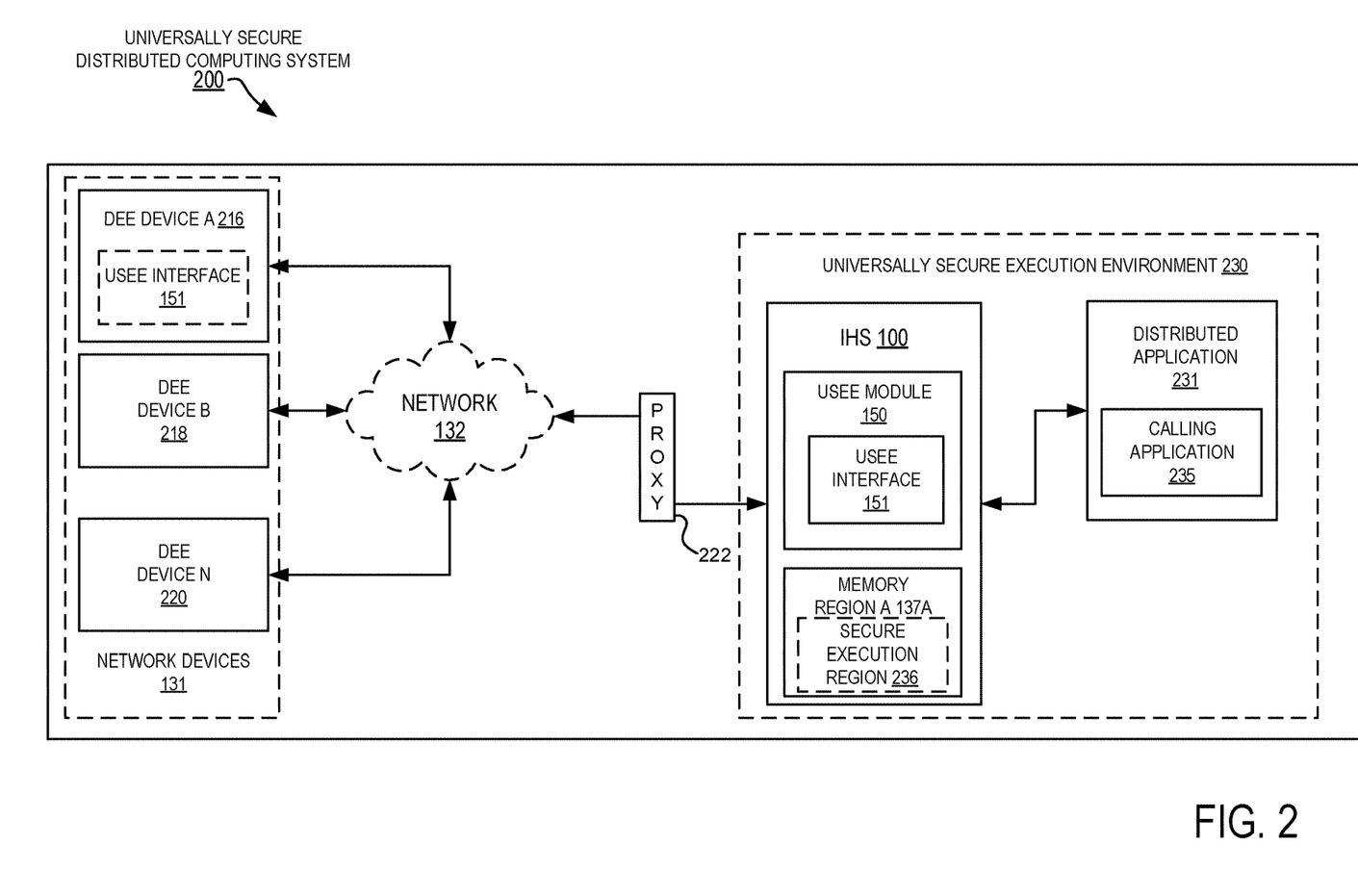
FIG. 2 illustrates example contents of the IHS of FIG. 1 in a universally secure distributed computing system, according to one or more embodiments.

FIG. 2 illustrates example contents of IHS 100 of FIG. 1 in a universally secure distributed computing system, according to one or more embodiments. Universally secure distributed computing system 200 includes, generally, network devices 131, network 132, service proxy 222, and universally secure execution environment 230. Diverse execution environment (DEE) device A 216, DEE device B 218, and DEE device N 220 are example devices associated with network devices 131. Universally secure execution environment 230 includes IHS 100 and distributed application 231. As illustrated, IHS 100 includes USEE module 150 and USEE interface 151. Distributed application 231 includes calling application 235.

Distributed application 231 can operate in a distributed system among multiple nodes. Nodes, such as DEE device A 216, DEE device B 218, and DEE device N 220 can each execute a portion of distributed application 231. Distributed application 231 can use services provided by DEE device A 216, DEE device B 218, and DEE device N 220 and/or move between DEE device A 216, DEE device B 218, and DEE device N 220 in operation. Each of DEE device A 216, DEE device B 218, and DEE device N 220 communicate with one another via IHS 100 and can negotiate execution points of distributed application 231 through IHS 100. In response to a distributed computing device selecting nodes to receive distributed application 231, calling application 235 is respectively executed at each node. Calling application 235 is executed on the respected node(s) through IHS 100, according to configuration parameters provided by distributed application 231.

DEE device A 216, DEE device B 218, and DEE device N 220 can be, for example, and EOH device, EOC device, and/or a SEEasS device. DEE device A 216, DEE device B 218, and DEE device N 220 are associated with a secure execution environment (SEE). As presented herein, SEEs are specialized run-time memory regions. A SEE implementation enables data and applications/programs within memory regions associated with DEE device A 216, DEE device B 218, and DEE device N 220 to remain un-accessed by non-authorized applications and/or devices. DEE device A 216, DEE device B 218, and DEE device N 220 may include "SEE regions" of memory that are protected from being read, altered, and/or intercepted by an unauthorized source.

In one embodiment, each of DEE device A 216, DEE device B 218, and DEE device N 220 has a separate protocol for accessing a respective portion of the memory region. In another embodiment, each of DEE device A 216, DEE device B 218, and DEE device N 220 can be accessed utilizing trusted universal security credentials provided by IHS 100. Further, each of DEE device A 216, DEE device B 218, and DEE device N 220 may have a separate security credential requirement. Processor 104 associates, based on the distributed computing framework, secure execution environment interface 151 with each diverse execution environment from among a plurality of diverse execution environments (DEE device A 216, DEE device B 218, and DEE device N 220). USEE interface 151 transparently manages security credentials for each of DEE device A 216, DEE device B 218, and DEE device N 220, by establishing a secure handshake with the respective device according to a respective SEE protocol for the device.

In operation, processor 104 receives a request from distributed application 231 to access a secure memory region associated with at least one of DEE device A 216, DEE device B 218, and DEE device N 220 during at least a portion of the runtime. DEE device 216, 218, and 220 can be, for example, a device that is in an execute-on-host or execute-on-chip environment. Processor 104 enables IHS 100 to prompt the requesting application, distributed application 231, for entry of security credentials at the secure execution environment interface of USEE interface 151. In response to receiving and verifying the security credentials to obtain access to the secure memory region for the respective device (216, 218, 220), USEE module 150 enables processor 104 to generate USEE interface 151. Processor 104 enables access to a DEE device in a secure execution environment that comprises memory regions. The memory regions are selectively accessible during runtime operations of the respective diverse execution environments (216). Processor 104 establishes secure access to the respective one of the plurality of diverse execution environments (216, 218, 220) during execution of runtime operations and after completion of runtime operations.

In one embodiment, USEE interface 151 is generated on a memory region on the respective one of the plurality of diverse execution environments (216). In another embodiment, USEE interface 151 is generated on memory region A 137*a*, and distributed application 231 accesses the respective one of the plurality of diverse execution environments (216, 218, 220) via USEE interface 151. USEE interface 151 establishes access to the secure memory region of the respective one of the plurality of diverse execution environments (216, 218, 220) via service proxy 222. USEE interface 151 can be, for example, established through a proxy 222 that communicates with each of the diverse execution environment. In one embodiment, proxy 222 communicates distributed application 231 to each node, DEE device A 216, DEE device B 218, and DEE device N 220, without calling application 235 identifying the respective nodes. In response to a request to access a DEE device that is not equipped with a physical SEE solution, processor 104 establishes USEE interface 151 as a secure service proxy that provides a data export method to/from distributed application 231.

In one embodiment, processor 104 establishes an intermediate bi-directional communication pathway between each diverse execution environment and/or DEE device and USEE interface 151 utilizing service proxy 222. Processor 104 loads distributed application 231 to a respective secure memory region, via the intermediate bi-directional communication pathway, in preparation for execution by service proxy 222. Service proxy 222 conceals operations of USEE interface 151 from calling application 235 and applications associated with each diverse execution environment.

In one embodiment, processor 104 enables access to a secure portion of a memory region of DEE device A 216, DEE device B 218, and DEE device N 220 during at least a portion of the runtime for the respective DEE device (216, 218, 220). When DEE device 218 is in an execute-on-host environment, processor 104 accesses the secure portion of memory by requesting access to a runtime secure memory region and executing a subroutine of the distributed application in the runtime secure memory region of the execute-on-host environment. DEE device 218 initiates a boot up in a secure mode. Processor 104 enables the respective operating system to verify that responding to the request from distributed application 231 is not a violation of system policy. Processor 104 establishes the secure access to the respective memory region via USEE interface 151. USEE interface 151 establishes an isolated region that accesses the specified portion of memory of the respective one of the plurality of diverse execution environments (216, 218, 220). USEE interface 151 concurrently rejects access requests to other components of the respective diverse execution environment (216, 218, 220).

Further, subsequent to establishing access to the secure memory region, processor 104 executes a subroutine provided by the distributed application. In one embodiment, the subroutine modifies at least a subset of the secure memory region of the respective one of the plurality of diverse execution environments (216, 218, 220). Processor 104 returns a result to distributed application 231 via universally secure execution environment interface 151. In another embodiment, USEE interface 151 receives the result to send to and/or update distributed application 231. Generating USEE interface 151 to establish secure communication among multiple different implementations of devices comprising SEE solutions advantageously offers an isolated and secure distributed process for accessing and modifying memory regions associated with multiple different implementations of devices comprising SEE solutions. Together, DEE devices (116, 218, 220) provide an increased amount of resources to developers. Universally secure distributed computer system 200 utilizes a distributed computing framework to enable seamless access to the increased amount of resources provided by DEE devices (116, 218, 220).

Figure 3:
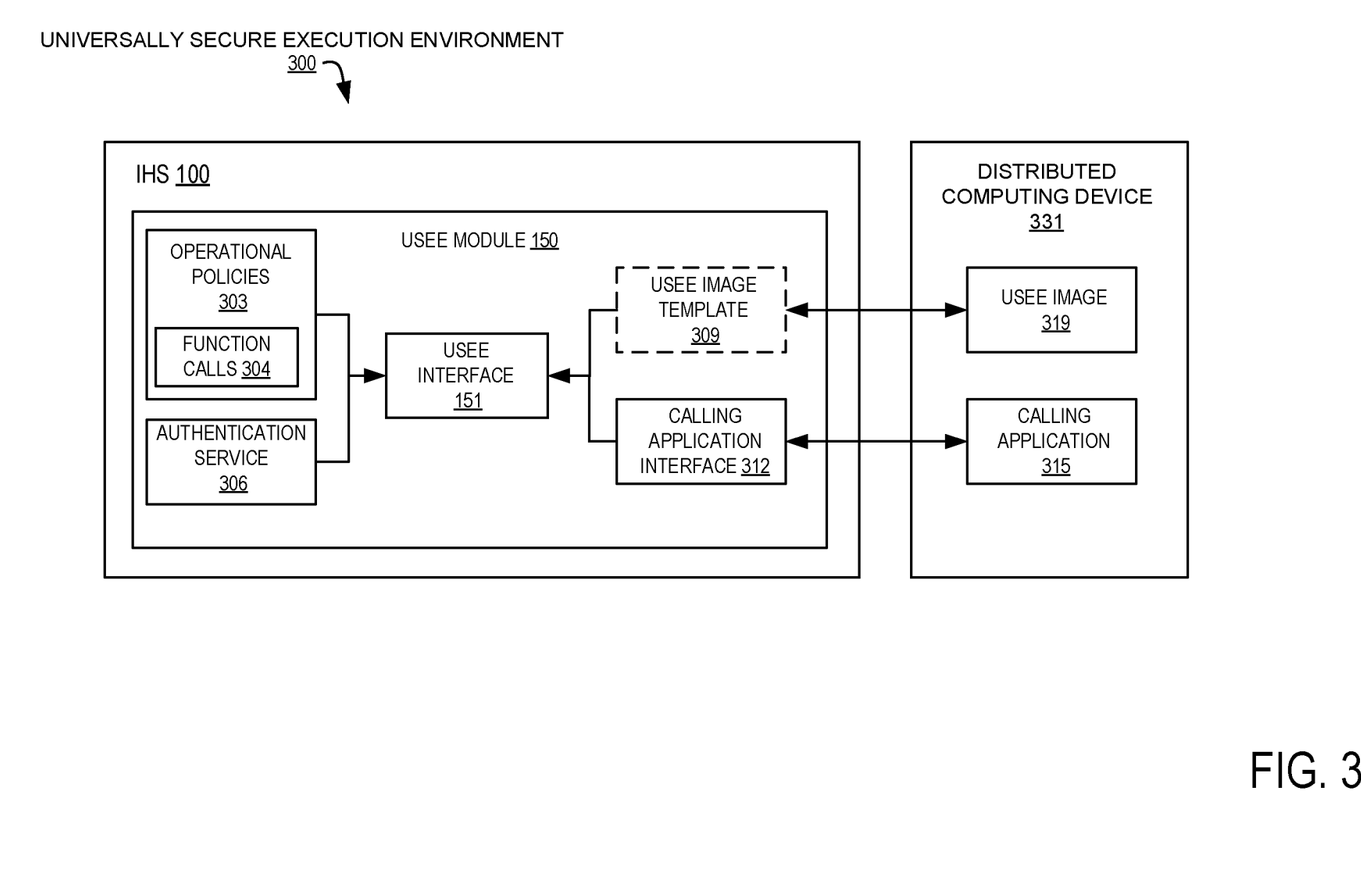
FIG. 3 illustrates the IHS of FIG. 1 in a universally secure execution environment having at least one distributed computing device, according to one or more embodiments.

FIG. 3 illustrates IHS 100 of FIG. 1 in a universally secure execution environment (300) having at least one distributed computing device, according to one or more embodiments. Universally secure execution environment 300 includes IHS 100 in communication with distributed computing device 331. Executing USEE module 150, IHS 100 establishes operational policies 303, authentication service 306, USEE image template 309, and calling application interface 312. Distributed computing device 331 communicates USEE image 319 and calling application 315 to IHS 100.

Operational policies 303 can vary for each DEE device. Operational policies 303 stores, for each DEE type and/or device certification information, attestation data and communication transports for individual access to each DEE device (216) during runtime. Only memory region access requests that are consistent with policies established by operation policies 303 are provided to the DEE device (216) via USEE interface 151. USEE interface 151 receives operational policies 303 and enables access, in part based on operational policies 303. Operational policies 303 can include a library of function calls, metrics describing runtime SEE operations, native operational code of the respective DEE-processor, performance requirements, max memory-size, and data transport methods. In one embodiment, USEE module 150 enables a selectable configuration for operational policies 303, where a user and/or computer system can dynamically configure USEE interface 151 to establish a connection with the DEE device (216) based on the selected operational policies 303. In another embodiment, operational policies 303 are established based on the configuration of the DEE device (216). During runtime, processor 104 establishes, via a network connection (132), a secure communication link between USEE interface 151 and each DEE device (216, 218, 220) using selectively determined function calls that are associated with a shared library of function calls within operational policies 303.

Authentication service 306 is enabled by USEE module 150 to verify the requesting device is a valid device for obtaining access to the DEE device (216). In one embodiment, authentication service 306 is unique for each DEE device (216, 218, 220). In another embodiment, authentication service 306 is a general attestation code unique to IHS 100 for all DEE devices associated with the universally secure distributed computing system (200). Utilizing the general attestation code, processor 104 has a trusted communication link with the DEE devices (216, 218, 220). For example, for distributed application purposes, IHS 100 can access a specified portion of the memory region of the DEE devices.

USEE image template 309 is a copy of USEE image 319, stored in a memory region of IHS 100. USEE image 319 is utilized to authenticate a user and/or a device requesting access to a memory region of a DEE device, for example, distributing computing device 331. In one embodiment, USEE image 319 is user specific. In another embodiment, USEE image 319 is specific to a requesting device. USEE image 319 can be, for example, a personal identification number, password, and/or biometric identification methods. The biometric identification methods can include facial recognition, fingerprint sensor, and/or voice authorization. A copy of the USEE image is stored in a memory region of IHS 100 as USEE image template 319, and the copy is accessible by processor 104 for verification purposes. In one embodiment, in response to a request from a distributed application to access a memory region associated with at least one DEE device or memory region thereof, processor 104 prompts for entry of security credentials at USEE interface 151. Processor 104 receives USEE image 309 and compares the received USEE image 309 to USEE image template 319. In response to verifying the security credentials, processor 104 establishes, by the USEE interface 151, access to the secure memory region of the respective one of the plurality of DEE devices. In response to the security credentials not being valid, processor 104 denies access to the secure memory region.

In one embodiment, calling application interface 312 receives instructions for the distributed application that is initiated by calling application 315 on distributed computing device 331. Calling application 315 provides access to applications and/or software requesting permission to modify at least one memory region associated with respective DEE devices (216, 218, 220). Calling application 315 can provide access to distributed applications executed from a single distributed computing device 331 or a group of distributed computing device(s) simultaneously, for a single task. Calling application 315 loads program data to the secure execution region of USEE interface 151. Over the service proxy (222), program data is executed from USEE interface 151 and communicated back to calling application 315 via USEE interface 151.

Figure 4:
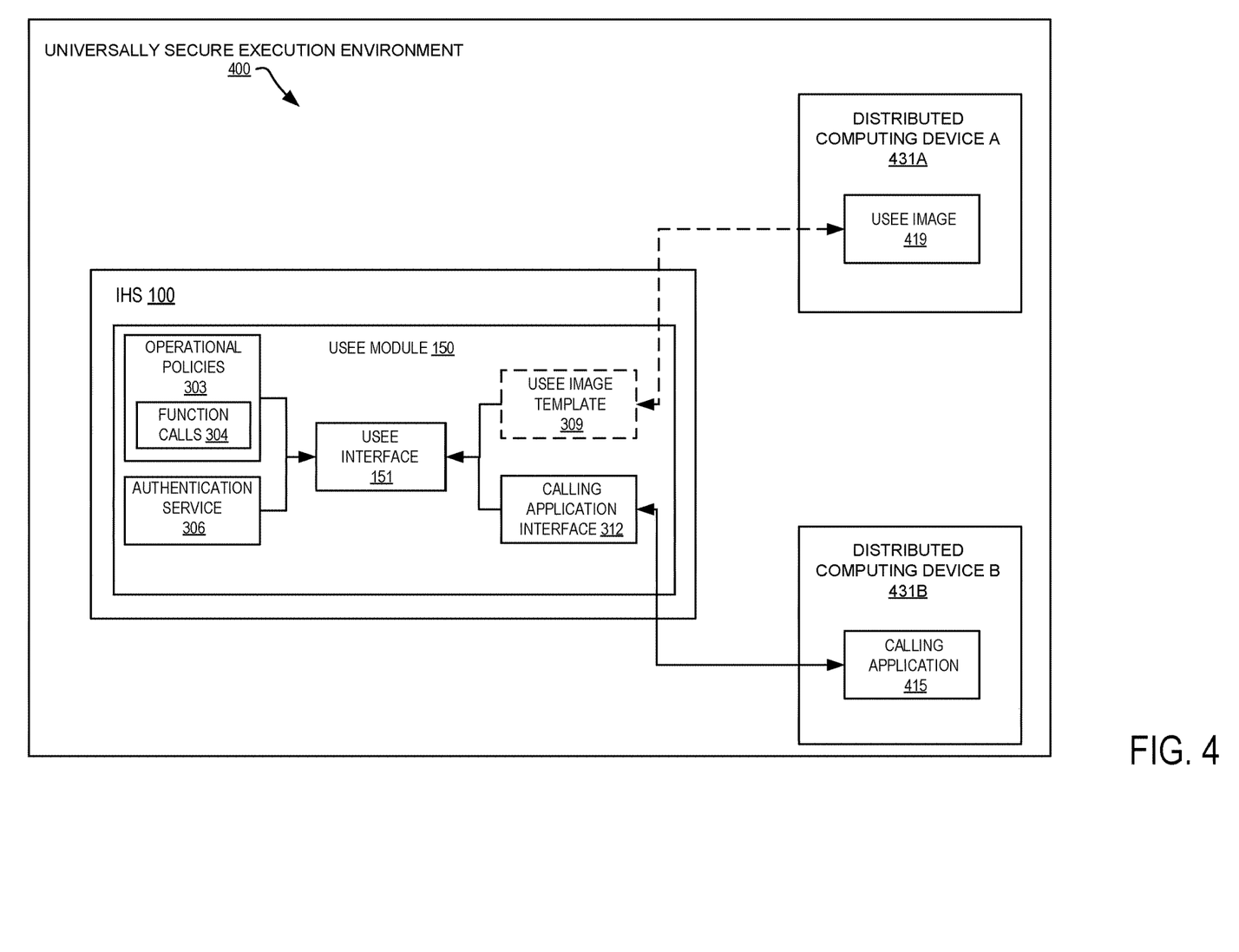
FIG. 4 illustrates the IHS of FIG. 1 in a universally secure execution environment having at least two distributed computing devices, according to one or more embodiments.

FIG. 4 illustrates the IHS of FIG. 1 in a universally secure execution environment having two or more distributed computing devices, according to one or more embodiments. Universally secure execution environment 400 includes IHS 100 in communication with distributed computing device 431A and distributed computing device 431B. Executing USEE module 150, IHS 100 establishes operational policies 303, authentication service 306, USEE image template 309, and calling application interface 312. Distributed computing device A 431A communicates USEE image 419 to IHS 100. Distributed computing device B 431B communicates calling application 415 to IHS 100.

USEE image template 309 is a copy of USEE image 419, stored in a memory region of IHS 100. USEE image 419 is utilized to authenticate a user and/or a device requesting access to a memory region of a DEE device, for example, calling application 415 of distributed computing device 431. A copy of the USEE image is stored in a memory region of IHS 100 as USEE image template 309 and is accessible by processor 104 for verification purposes. In one embodiment, in response to a request from distributed computing device B 431B to access a memory region associated with at least one DEE device or memory region thereof, processor 104 prompts for entry of security credentials at USEE interface 151. Processor 104 receives USEE image 419 and compares the received USEE image 419 to USEE image template 309. In response to verifying the security credentials, processor 104 receives the calling application at calling application interface 312. Processor 104 establishes, by the USEE interface 151, access to the secure memory region of the respective one of the plurality of DEE devices. In response to the security credentials not being valid, processor 104 denies loading of calling application 415 and denies access to the secure memory region.

Figure 5:
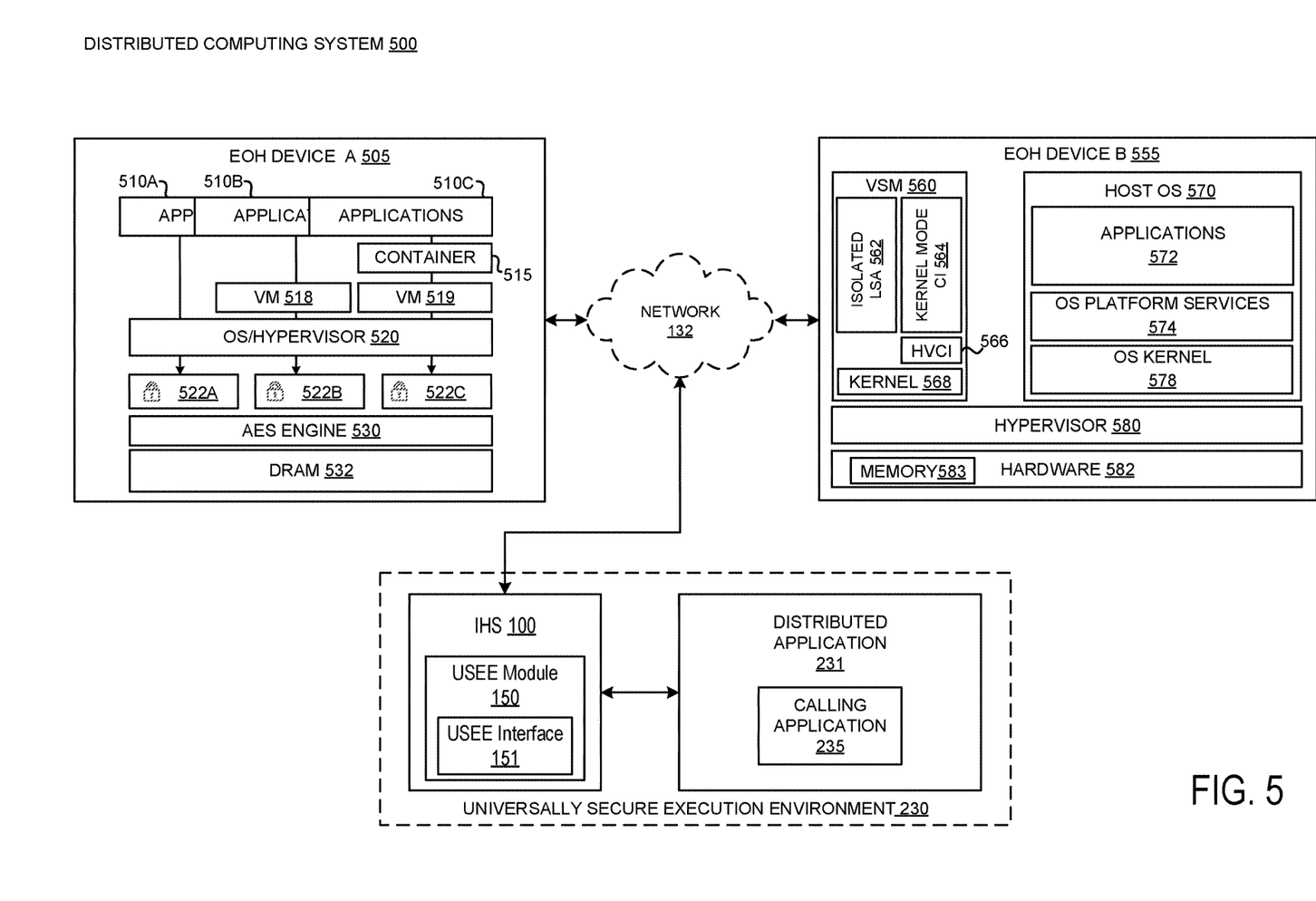
FIG. 5 illustrates an example distributed computing system for a secure execute on host environment, according to one or more embodiments.

FIG. 5 illustrates an example EOH distributed computing system (500) for a secure execute on host environment, according to one or more embodiments. Example distributed computing system 500 includes universally secure execution environment 220, which communicates with EOH device A 505 and EOH device B 555 via network 132. EOH device A 505 and EOH device B 555 are computing devices in an execute-on-host environment. EOH device A 505 includes, generally, applications 501A-C, container 515, virtual machine 518, virtual machine (VM) 519, operating system (OS)/hypervisor 520, access key A 522A, access key B 522B, access key C 522C, advanced encryption standard (AES) engine 530, and dynamic random-access memory (DRAM) 532. EOH device B 555 generally includes virtual secure mode (VSM) 560, host OS 570, hypervisor 580, and hardware 582.

In one embodiment, EOH device A 505 can be utilized as a DEE device (FIG. 2). The infrastructure of EOH device 505 cryptographically isolates container 515 and virtual machines 518-519 from each other, from administrator tampering, and from untrusted access by a hypervisor, such as OS/hypervisor 520. Container 515, virtual machines 518-519, and OS/hypervisor 520 each have a separate access key (522A-C). In one embodiment, encrypted memory of EOH device A 505 cannot be deciphered without the appropriate access key (522A-C). In one example, distributed application 231 requests access to VM 518. For EOH A 505, communication with VM 518 occurs through tagged shared memory regions. Therefore, operational policies 303 for EOH A 505 include, for example, verified authentication of calling application 312 and input of access key 522B. In another example, EOH A 505 can include enclaves, which are protected areas of execution in memory (532), or Software Guard Extensions. In one embodiment, in response to receiving the request from distributed application 231 for the execute-on-host environment (505), processor 104 provides a decryption key to a decrypted memory region. In response to the verified authentication of calling application 312 and a valid access key 522B, processor 104 executes a communication routine through shared memory regions to predetermined trusted regions of the diverse execution environment. The predetermined trusted regions can be, for example, trusted regions comprising at least one of a Local Security Authority region (562), a Kernel Mode Code Integrity region (564), a Hypervisor Code Integrity region (566), Trusted Execution Environment (560), and Software Guard Extensions (532). In one example in EOH environments, where both the hypervisor and guest host are enabled for access, applications 510A-C will function and remain secure through the entire code-stack of the distributed application.

In one embodiment, EOH device A 505 can be utilized as a DEE device (FIG. 2). The infrastructure of EOH device 505 cryptographically isolates container 515 and virtual machines 518-519 from each other, from administrator tampering, and from untrusted access by a hypervisor, such as OS/hypervisor 520. Container 515, virtual machines 518-519, and OS/hypervisor 520 each have a separate access key (522A-C). In one embodiment, encrypted memory of EOH device A 505 cannot be deciphered without the appropriate access key (522A-C). In one example, distributed application 231 requests access to VM 518. For EOH A 505, communication with VM 518 occurs through tagged shared memory regions. Therefore operational policies 303 for EOH A 505 include, for example, verified authentication of calling application 312 and input of access key 522B. In another example, EOH A 505 can include enclaves, which are protected areas of execution in memory (532), or Software Guard Extensions. In one embodiment, in response to receiving the request from distributed application 231 for the execute-on-host environment (505), processor 104 provides a decryption key to a decrypted memory region. In response to the verified authentication of calling application 312 and a valid access key 522B, processor 104 executes a communication routine through shared memory regions to predetermined trusted regions of the diverse execution environment. The predetermined trusted regions can be, for example, trusted regions comprising at least one of a Local Security Authority region (562), a Kernel Mode Code Integrity region (564), a Hypervisor Code Integrity region (566), Trusted Execution Environment (560), and Software Guard Extensions (532). In one example in EOH environments, where both the hypervisor and guest host are enabled for access, applications 510A-C will function and remain secure through the entire code-stack of the distributed application.

In one embodiment, EOH device B 555 can be utilized as a DEE device (FIG. 2). VSM 560 is a security feature of EOH device B 555 that utilizes on-chip virtualization extensions of an associated CPU to isolate trusted processes and protect the trusted processes from other potentially malicious code. CPU's equipped with Secondary Layer Address Translation (SLAT) and an input/output memory management unit (IOMMU) are able to support VSM by use of hypervisor 580. Specific code can be tagged as belonging to other OS; however, the code is simply running in a container without an OS. Trustlets, short for trusted processes, are programs running as isolated user mode (IUM) processes in VSM 560. Truslets complete system calls by marshalling them over to OS kernel 578, creating a small execution environment. Isolated Local Security Authority (LSA) 562, Kernel Mode Code Integrity (KMCI) 564, and HyperVisor Code Integrity (HVCI) 580 have trustlet containing capabilities. In one embodiment, subsequent to authentication of distributed application 231, IHS 100 communicates calling application 235 through shared memory 583 to VSM 560 to secure an application environment. Virtual Trust Levels (VTL) may be assigned to IHS 100 in isolated regions for the purpose of elevating secure user regions to protect them from being accessed by code executed in other regions. Interfacing calling application 235 to VSM 560 advantageously enables support for developers deploying distributed application 231, even when the developers are not operating with the same platform as EOH device B 555.

Figure 6:
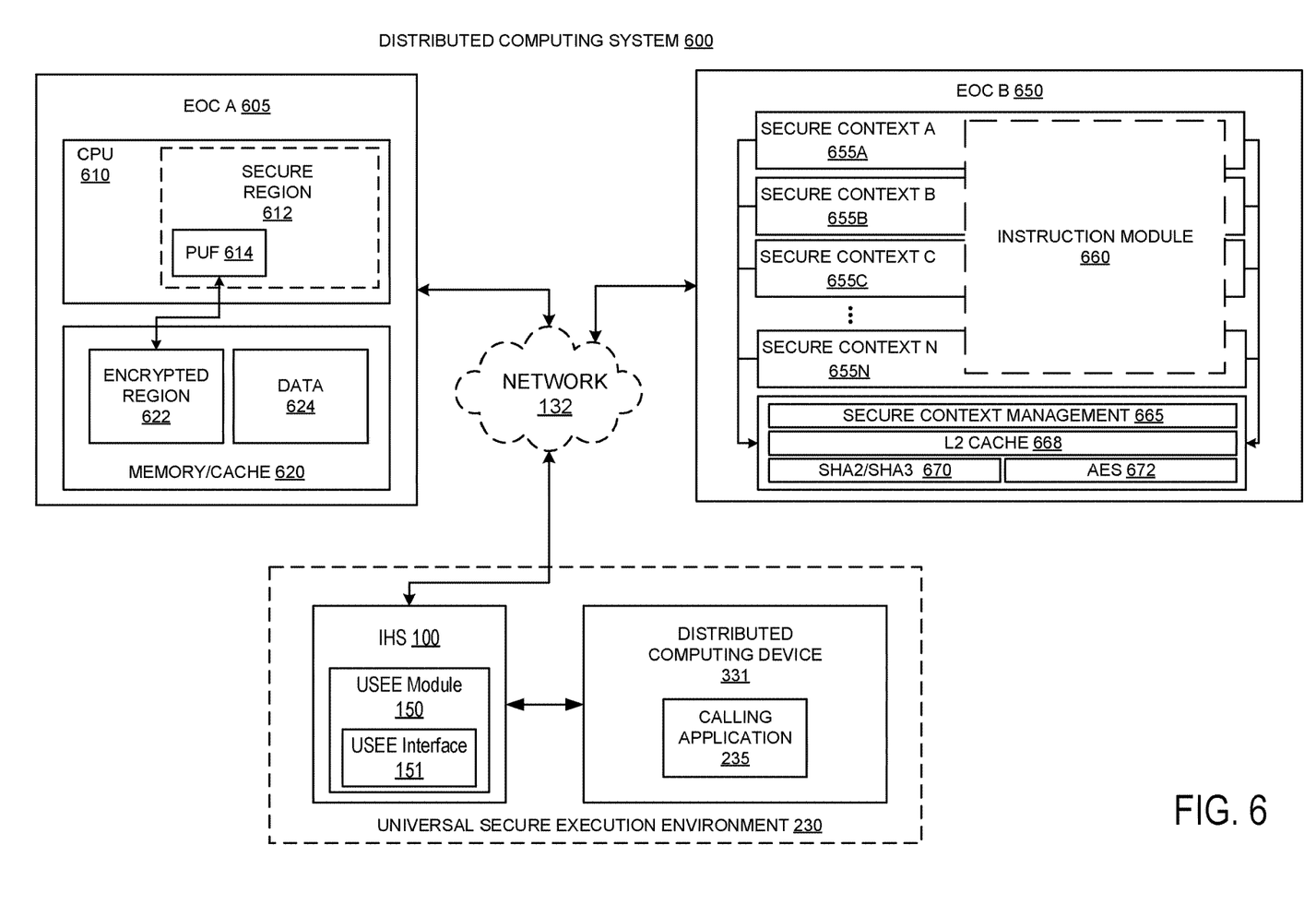
FIG. 6 illustrates an example distributed computing system for a secure execute on chip environment, according to one or more embodiments.

FIG. 6 illustrates an example distributed computing system for a secure execute on chip environment, according to one or more embodiments. Example distributed computing system 600 includes universally secure execution environment 230 which communicates with EOC device A 605 and EOC device B 650 via network 132. EOC device A 605 and EOC device B 650 are devices in an execute-on-host environment. EOC device A 605 includes, generally, CPU 610 and memory/cache 620. EOC device B 650 includes secure context A secure context N modules 655A-N, instruction module 660, secure context management 665, level two (L2) cache 668, secure hash algorithm two and three (SHA2/SHA3) 670 and advance encryption standard (AES) 672.

Figure 7:
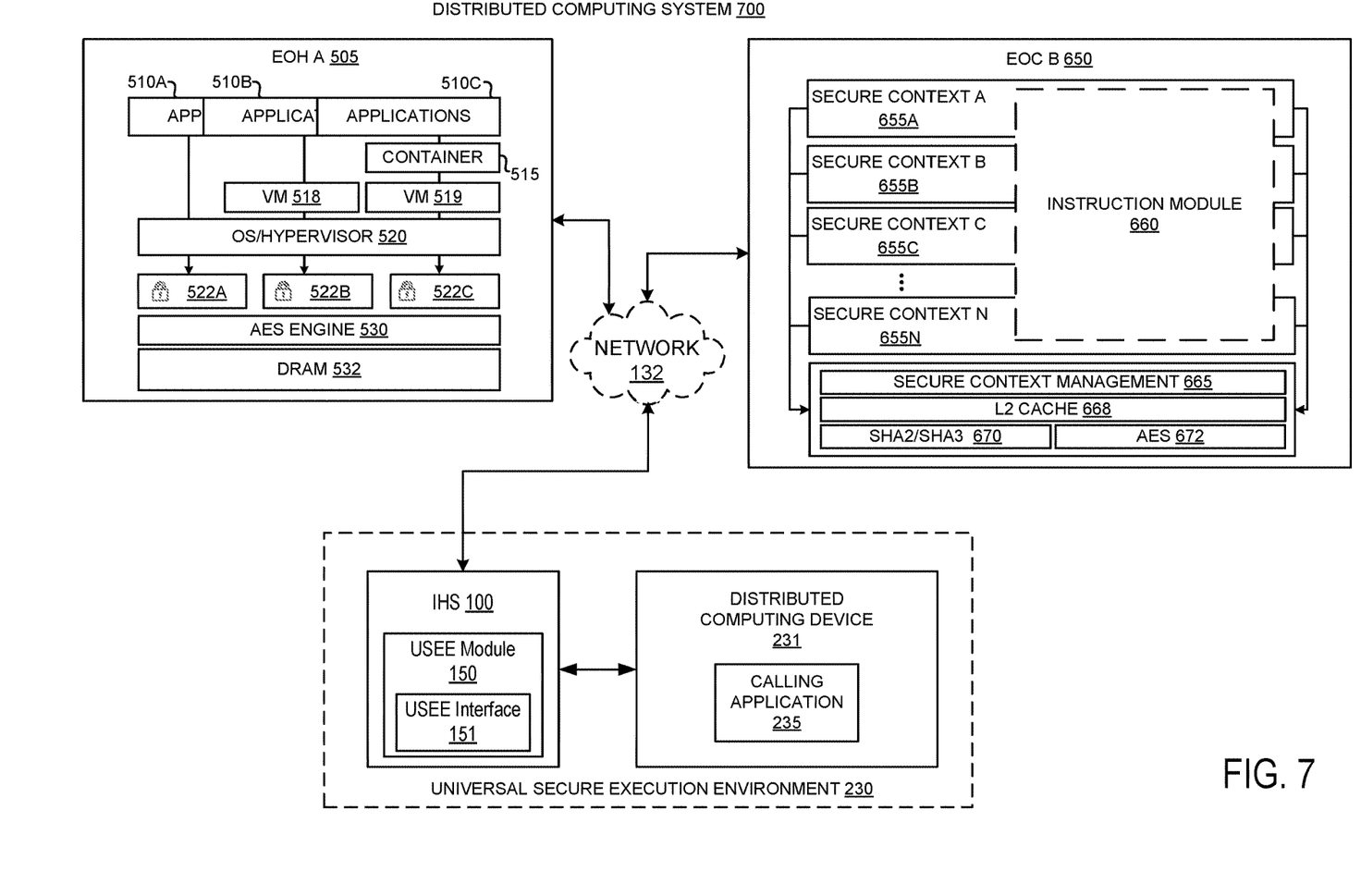
FIG. 7 illustrates an example distributed computing system for a secure execute on host environment and a secure execute on chip environment, according to one or more embodiments.

FIG. 7 illustrates an example distributed computing system for a secure execute on host environment and a secure execute on chip environment, according to one or more embodiments. Example distributed computing system 700 includes universally secure execution environment 220 which communicates with EOH device A 505 and EOC device B 650 via network 132. As depicted within distributed computing system 700, in one embodiment, an execute-on-host environment and an execute-on-chip environment can operate in a same distributed computing system. IHS 100, executes USEE module 150 and operates as a common distribution device for distributed application 231.

EOC device A 605 is a computing device that can be utilized as a DEE device (FIG. 2). EOC device A 605 has a Secure Execution physical unclonable function (PUF)-based Processor architecture (SEPP). CPU 610 of EOC device A 605 includes secure region 612. PUF 614 is directly integrated into the instruction pipeline of CPU 610. The infrastructure of EOC device A 605 offers a means to assure that interfaces for communicating with remote devices (especially when used as a secure execution co-processor) are protected. In one embodiment, operation policies 303 for EOC device A 605 include password, usernames, and/or other security measures that overcome the "hardened" security path provided by EOC device A 605. EOC device A 605 enables a secure pathway to/from IHS 100 when the hardened protective measures are properly addressed. In response to receiving the request from distributed application 231 for the execute-on-chip environment (605), USEE module 150 enables processor 104 to access the execute-on-chip environment (605) by encrypting distributed application 231 based on an encryption program image (622) generated by a target processor (610) associated with the secure execution on chip environment (605).

EOC device B 650 is also a computing device that can be utilized as a DEE device (FIG. 2). Secure context (A-N) 655A-N are software threads within a multi-threaded environment. EOC device B 650 enables protection to isolate each of secure context (A-N) 655A-N. Address space, such as within L2 cache 668 are assigned to a single set of secure contexts (A-N) 655A-N. The address spaces have unique encryption keys that are defined by SHA2/SHA3 670 and AES 672. In one embodiment, in response to receiving the request from distributed application 231 for a memory region within EOC device B 650, the USEE module enables processor 104 to access the EOC device B 650 by providing a unique decryption key to each execution context associated with an assigned address space and processor unit. Each of secure context (A-N) 655A-N remain protected from breaches from other threads or resources within the architecture of EOC device B 650. IHS 100 includes operational functions 303 for enabling access to EOC device B 650. The operational functions 303 may include, for example, decryption information for the unique encryption keys that are defined by SHA2/SHA3 670 and AES 672.

FIG. 6 illustrates an example distributed computing system for a secure execute on chip environment, according to one or more embodiments. Example distributed computing system 600 includes universally secure execution environment 230 which communicates with EOC device A 605 and EOC device B 650 via network 132. EOC device A 605 and EOC device B 650 are devices in an execute-on-host environment. EOC device A 605 includes, generally, CPU 610 and memory/cache 620. EOC device B 650 includes secure context A secure context N modules 655A-N, instruction module 660, secure context management 665, level two (L2) cache 668, secure hash algorithm two and three (SHA2/SHA3) 670 and advance encryption standard (AES) 672.

FIG. 7 illustrates an example distributed computing system for a secure execute on host environment and a secure execute on chip environment, according to one or more embodiments. Example distributed computing system 700 includes universally secure execution environment 220 which communicates with EOH device A 505 and EOC device B 650 via network 132. As depicted within distributed computing system 700, in one embodiment, an execute-on-host environment and an execute-on-chip environment can operate in a same distributed computing system. IHS 100, executes USEE module 150 and operates as a common distribution device for distributed application 231.

Figure 8:
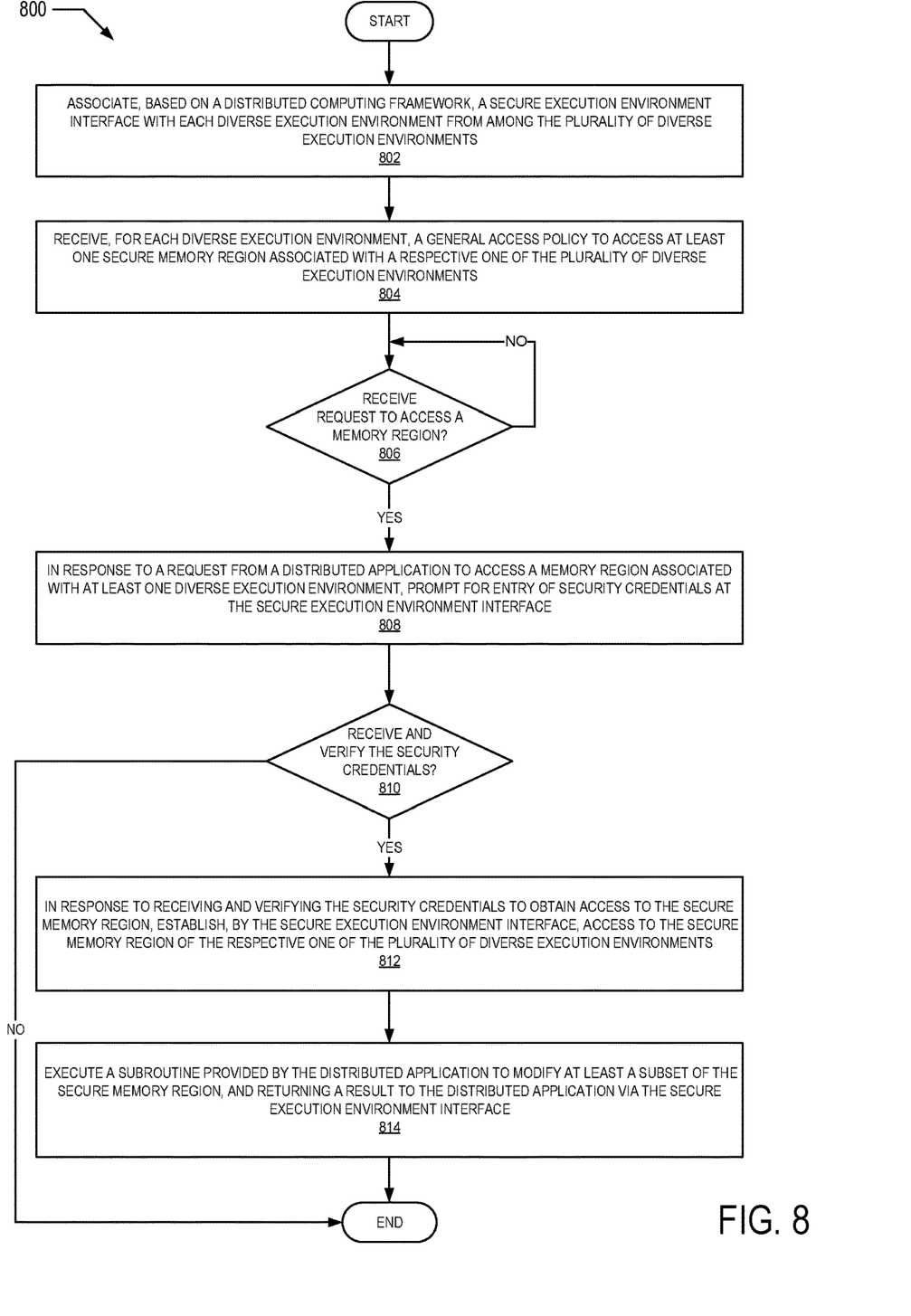
FIG. 8 illustrates a flow chart of a method for providing the universally secure execution environment, according to one or more embodiments.

FIG. 8 illustrates a flow chart of a method for providing the universally secure execution environment, according to one or more embodiments. Generally, method 800 represents computer-implemented methods. The description of method 800 is provided with general reference to the specific components illustrated within FIGS. 1-7.

Method 800 is performed when USEE module 150 is executed by processor 104. Method 800 begins at the start block and includes processor 104 associating, based on a distributed computing framework, a secure execution environment interface (151) with each diverse execution environment (216, 218, 220) from among the plurality of diverse execution environments, at block 802. IHS 100 receives target nodes (or DEE devices) from distribution application 231. At block 804 processor 104 receives, for each diverse execution environment, a general access policy (303) and associates with each diverse execution environment according to policies provided by operational policies 303. The general access policy (303) is utilized to access at least one secure memory region (518, 583) associated with a respective one of the plurality of diverse execution environments (216, 218, 220). A determination is made, at block 806, whether processor 104 received a request from a distributed application to access a memory region associated with at least one diverse execution environment. In response to not receiving the request, the method waits at block 806. In response to receiving a request from a distributed application to access a memory region associated with at least one diverse execution environment, processor 104 prompts for entry of security credentials at the secure execution environment interface (at block 808). At block 810, a decision is made whether processor 104 received and verified security credentials for obtaining access to the secure memory region. In response to not receiving and/or verifying the security credentials, the method ends. In response to receiving and verifying the security credentials to obtain access to the secure memory region, at block 812, processor 104 establishes, by the secure execution environment interface (151), access to the secure memory region of the respective one of the plurality of diverse execution environments (216, 218, 220). At block 814, processor 104 executes a subroutine provided by the distributed application. The subroutine modifies at least a subset of the secure memory region and returns a result to the distributed application via the secure execution environment interface (151).

In the above described flow chart of FIG. 8, one or more of the methods may be embodied in a controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out the disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in the specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for security management across a plurality of diverse execution environments, the method comprising:

associating, based on a distributed computing framework, a secure execution environment interface with each diverse execution environment from among the plurality of diverse execution environments that collectively execute subroutines of a distributed application within a secure execution environment, the distributed application operating in a distributed system among multiple nodes that can each execute a portion of the distributed application;

receiving, for each diverse execution environment, a general access policy to access at least one secure memory region associated with a respective one of the plurality of diverse execution environments;

in response to a request from the distributed application to access a secure memory region associated with at least one diverse execution environment, prompting for entry at the secure execution environment interface of security credentials to obtain access to the secure memory region;

in response to receiving and verifying the security credentials to obtain access to the secure memory region, establishing, by the secure execution environment interface, access to the secure memory region of the respective one of the plurality of diverse execution environments; and executing a subroutine provided by the distributed application to read and/or alter data in at least a subset of the secure memory region, and returning a result to the distributed application via the secure execution environment interface.

2. The method of claim 1, further comprising:
   determining when at least one diverse execution environment is executing a runtime operation;
   in response to the determining, prompting for entry of security credentials to a respective at least one diverse execution environment to obtain access to the secure memory region during at least a portion of the runtime operation;
   in response to the receiving and the verifying of the security credentials, providing access to at least a portion of the secure memory region during the runtime operation for the respective at least one diverse execution environment; and
   in response to the security credentials not being valid, denying access to the secure memory region.

3. The method of claim 1, wherein the secure execution environment comprises specialized run-time memory regions that enables data and applications within memory regions associated with each node to remain un-accessed by non-authorized applications and devices, the at least one diverse execution environment comprises diverse execution environment (DEE) devices, the devices operating in at least one or more of an execute-on-host environment and an execute-on-chip environment.

4. The method of claim 3, further comprising in response to receiving the request from the distributed application for the execute-on-host environment, accessing the execute-on-host environment by performing one or more of: (i) requesting access to a runtime secure memory region and executing the subroutine of the distributed application in the runtime secure memory region, (ii) providing a decryption key to a decrypted memory region, and (iii) executing a communication routine through shared memory regions to predetermined trusted regions of the diverse execution environment.

5. The method of claim 4, wherein the predetermined trusted regions comprise at least one of a Local Security Authority region, a Kernel Mode Code Integrity region, a Hypervisor Code Integrity region, Trusted Execution Environment, and Software Guard Extensions.

6. The method of claim 3, further comprising in response to receiving the request from the distributed application for the execute-on-chip environment, accessing the execute-on-chip environment by performing one or more of: (i) providing a unique decryption key to each execution context associated with an assigned address space and processor unit, and (ii) encrypting the distributed application based on an encryption program image generated by a target processor associated with the secure execution on chip environment.

7. The method of claim 1, further comprising establishing, during runtime, via a network connection, a secure communication link between the secure execution environment interface and each diverse execution environment using selectively determined function calls that are associated with a shared library of function calls.

8. The method of claim 1, further comprising:
   establishing an intermediate bi-directional communication pathway between each diverse execution environment and the secure execution environment interface utilizing a service proxy; and
   loading a copy of the distributed application to a respective secure memory region, via the intermediate bi-directional communication pathway, in preparation for execution;
   wherein the service proxy conceals operations of the secure execution environment interface from applications associated with each diverse execution environment.

9. The method of claim 1, further comprising:
   enabling access to a secure execution environment that comprises memory regions that are selectively accessible during runtime operations of the respective diverse execution environment; and
   establishing secure access to the respective one of the plurality of diverse execution environments during execution of runtime operations and after completion of runtime operations.

10. The method of claim 1, wherein a first node among the multiple nodes is an execute on chip (EOC) device having a Secure Execution physical unclonable function (PUF)-based Processor architecture (SEPP) that includes a secure region, the PUF directly integrated into an instruction pipeline of the SEPP.

11. The method of claim 10, further comprising:
    in response to receiving a request from the distributed application for an execute-on-chip environment, accessing the execute-on-chip environment by encrypting the distributed application based on an encryption program image generated by a target processor associated with the secure execution on chip environment.

12. An Information Handling System (IHS) comprising:
    a network interface device;
    a processor communicatively coupled to the network interface device; and
    a memory system communicatively coupled to the processor and having stored thereon a secure execution environment module that executes on the processor to enable the processor to:
       associate, based on a distributed computing framework, a secure execution environment interface with each diverse execution environment from among a plurality of diverse execution environments external to the IHS and that collectively execute subroutines of a distributed application within a secure execution environment, the distributed application operating in a distributed system among multiple nodes that can each execute a portion of the distributed application, each node communicating with one another via the IHS and negotiating execution points of the distributed application 231 through the IHS;
    receive, for each diverse execution environment, a general access policy to access at least one secure memory region associated with a respective one of the plurality of diverse execution environments;
       in response to a request from the distributed application to access a secure memory region associated with at least one diverse execution environment, prompting for entry at the secure execution environment interface of security credentials to obtain access to the secure memory region;
       in response to receiving and verifying the security credentials to obtain access to the secure memory region, establish, by the secure execution environment interface, access to the secure memory region of the respective one of the plurality of diverse execution environments; and
       execute a subroutine provided by the distributed application to read and/or alter data in at least a subset of the secure memory region, and return a result to the distributed application via the secure execution environment interface.

13. The IHS of claim 12, wherein the secure execution environment module further enables the processor to:
- determine when at least one diverse execution environment is executing a runtime operation;
- in response to the determining, prompt for entry of security credentials to a respective at least one diverse execution environment to obtain access to the secure memory region during at least a portion of the runtime operation;
- in response to the receiving and the verifying of the security credentials, providing access to at least a portion of the secure memory region during the runtime operation for the respective at least one diverse execution environment; and
- in response to the security credentials not being valid, denying access to the secure memory region.

14. The IHS of claim 12, wherein the secure execution environment comprises specialized run-time memory regions that enables data and applications within memory regions associated with each node to remain un-accessed by non-authorized applications and devices, the at least one diverse execution environment comprises diverse execution environment (DEE) devices, the devices operating in at least one of an execute-on-host environment and an execute-on-chip environment.

15. The IHS of claim 14, wherein in response to receiving the request from the distributed application for the execute-on-host environment, the secure execution environment module further enables the processor to access the execute-on-host environment by performing one or more of: (i) requesting access to a runtime secure memory region and executing the subroutine of the distributed application in the runtime secure memory region, (ii) providing a decryption key to a decrypted memory region, and (iii) executing a communication routine through shared memory regions to a predetermined trusted regions of the diverse execution environment.

16. The IHS of claim 15, wherein the predetermined trusted regions comprise at least one of a Local Security Authority region, a Kernel Mode Code Integrity region, a Hypervisor Code Integrity region, Trusted Execution Environment, and Software Guard Extensions.

17. The IHS of claim 14, wherein in response to receiving the request from the distributed application for the execute-on-chip environment, the secure execution environment module further enables the processor to access the execute-on-chip environment by performing one or more of: (i) providing a unique decryption key to each execution context associated with an assigned address space and processor unit, and (ii) encrypting the distributed application based on an encryption program image generated by a target processor associated with the secure execution on chip environment.

18. The IHS of claim 12, wherein the secure execution environment module further enables the processor to during runtime, establish a secure communication link, via a network connection, between the secure execution environment interface and each diverse execution environment using selectively determined function calls that are associated with a shared library of function calls.

19. The IHS of claim 12, wherein the secure execution environment module further enables the processor to:
- establish an intermediate bi-directional communication pathway between each diverse execution environment and the secure execution environment interface utilizing a service proxy; and
- load a copy of the distributed application to a respective secure memory region, via the intermediate bi-directional communication pathway, in preparation for execution;
- wherein the service proxy conceals operations of the secure execution environment interface from applications associated with each diverse execution environment.

20. The IHS of claim 12, wherein the secure execution environment module further enables the processor to:
- enable access to a secure execution environment that comprises memory regions that are selectively accessible during runtime operations of the respective diverse execution environment; and
- establish secure access to the respective one of the plurality of diverse execution environments during execution of runtime operations and after completion of runtime operations.

* * * * *